United States Patent Office 2,841,448
Patented July 1, 1958

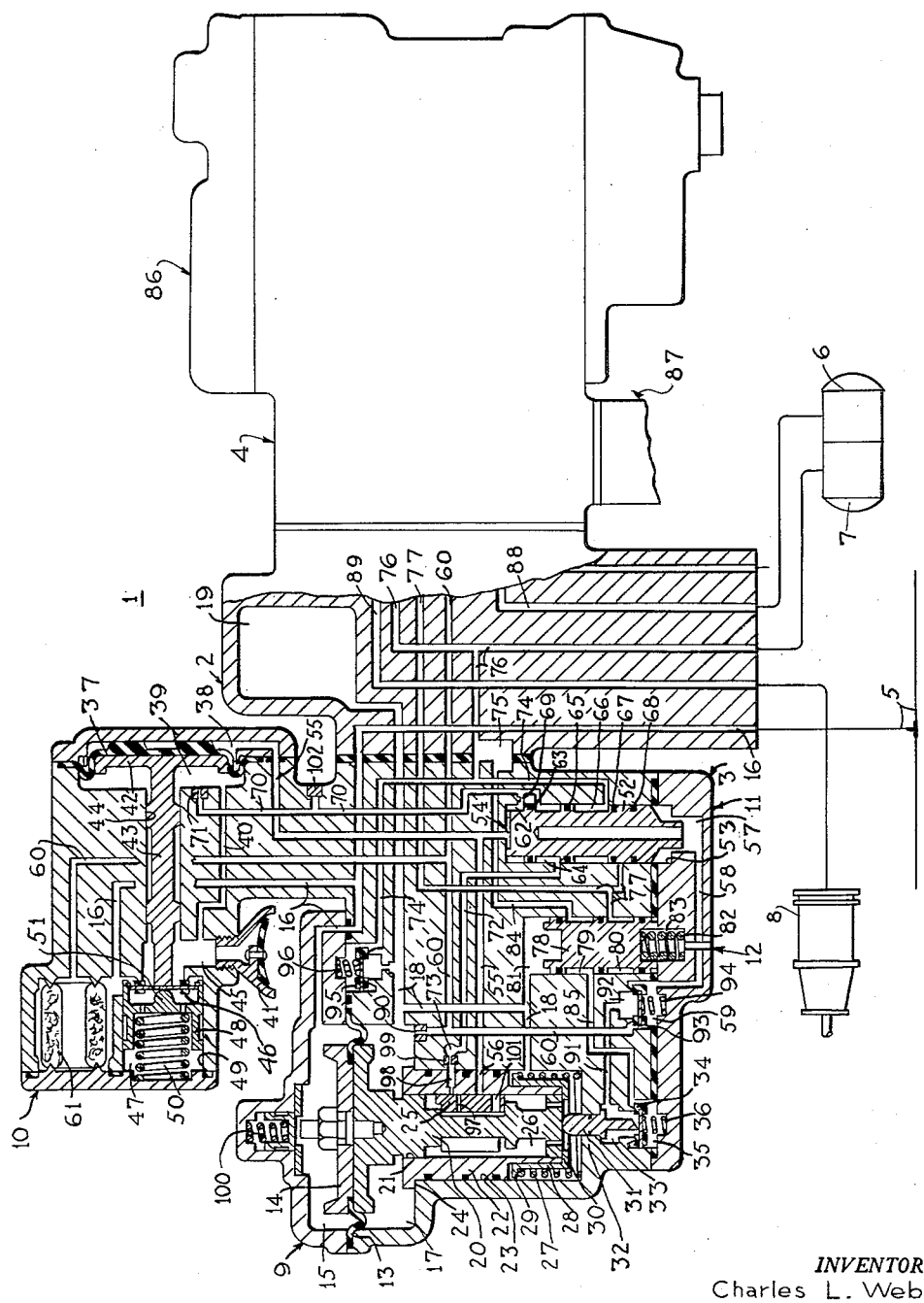
INVENTOR.
Charles L. Weber
BY Adelbert O. Steinmiller
ATTORNEY

2,841,448

FLUID PRESSURE BRAKE APPARATUS WITH MEANS WHEREBY RELEASE OF BRAKES FOLLOWING AN EMERGENCY APPLICATION MAY BE MORE PROMPTLY INITIATED

Charles L. Weber, Pittsburgh, Pa., assignor to Westinghouse Air Brake Company, Wilmerding, Pa., a corporation of Pennsylvania Application November 29, 1955, Serial No. 549,648

8 Claims. (Cl. 303—46)

This invention relates to fluid pressure brake apparatus for railway cars and trains embodying means responsive to an emergency rate of reduction in pressure of fluid in a brake pipe to effect an emergency application of brakes, and more particularly relates to improvements in said means whereby, with a simple operation, said means may optionally be adapted to either provide the conventional one-minute delay period before brakes can be released following an emergency application, such as presently desirable in normal freight service with long trains, or permti a brake release to be initiated in a substantially shorter period, as is desirable under certain conditions hereinafter to be described.

In the copending application of Glenn M. Thomas and Glenn T. McClure, Serial No. 500,060, filed April 8, 1955 and assigned to the assignee of the present invention, there is shown and described a brake apparatus of the above general type, designated as the "AC" valve and providing improved characteristics with respect to the older and well-known "AB" valve. In this "AC" valve, an emergency valve responds to an emergency rate of reduction in brake pipe pressure to release fluid under pressure from a quick action chamber to a passage leading to a pressure chamber of a pneumatically-operated emergency vent valve for causing the latter to move from a closed position to an open position for venting the brake pipe to atmosphere and also supplying quick action chamber air via a branch of said passage to another passage leading to a high pressure valve which is thereby shifted to a position for supplying air from an emergency reservoir to the brake cylinder. Also, the vent valve in open position opens the first mentioned passage to atmosphere via a quick action chamber blowdown delay choke within the valve casing until quick action chamber pressure in the aforementioned pressure chamber has reduced to about 7 to 6 p. s. i.; whereupon the vent valve will be moved by a spring bias toward closed position to what may be termed an "intermediate" position in which release flow from the quick action chamber to the blowdown choke is cut off, but a restricted passageway in the vent valve stem and leading to atmosphere is not yet in registry with the aforesaid passage. Hence in this "intermediate" position quick action chamber can blow down into the vented brake pipe solely by back flow through the usual quick action chamber charging choke; and by the time such pressure is reduced to about 1 p. s. i., the vent valve will have been shifted to its closed position.

This arrangement functions very satisfactorily to provide the conventional one-minute delay in closure of the vent valve, which is desirable in normal freight service (where trains are generally very long) in order to assure complete venting of the brake pipe throughout the train before any of the vent valves on the respective cars return to closed position. However, it has been found that even if the blowdown choke is removed completely (for reasons hereinafter to be described) about 8½ seconds will be required to effect closure of the vent valve, due to the restricted blowdown rate by way of the quick action chamber charging chokes in the so-called "intermediate" position of the vent valve.

In certain special types of service, where trains are short, it is desirable to reduce quick action chamber pressure at a continuous substantially unrestricted rate to cause the vent valve to return to closed position within 3½ or 4 seconds, which cannot be accomplished with the above-described apparatus for reasons just explained. For example, it is customary to spot ore cars in precise position for dumping by effecting an emergency application of brakes. The ore cars, which are arranged in short trains of about a dozen cars, can be emptied so rapidly that it is desirable to reclose the vent valve within about 4 seconds after the brakes have been applied, so that release of the emergency application can be initiated as soon as a particular car has been dumped and the train can be moved more promptly to spot the adjacent car.

One object of the invention is therefore to provide an improved brake apparatus of the above general type embodying a novel arrangement for effecting reclosure of the emergency vent valve within any selectable period in excess of about 3½ seconds after its movement to open position.

Another object is to provide an improved brake apparatus of the above general type embodying a novel arrangement whereby release of fluid under pressure from the quick action chamber is controlled by operation of the high pressure valve, instead of by the emergency vent valve as heretofore proposed.

Another object is to provide an improved emergency vent valve arrangement which is of relatively lower cost than that heretofore proposed and which at the same time provides the advantages described in the preceding objects.

Other objects and advantages will become apparent from the following more detailed description of the invention and from the accompanying drawing, wherein the single figure is a diagrammatic view of a fluid pressure brake apparatus embodying the invention.

DESCRIPTION

As shown in the drawing, the improved brake apparatus comprises, on each car, a brake controlling valve device 1 which, in turn, comprises a pipe bracket 2, on faces of which are suitably mounted an emergency portion 3 and a service portion 4. To the pipe bracket 2 is suitably connected a branch of the usual brake pipe 5, which pipe is adapted to extend through the train and in which the pressure of fluid is adapted to be varied in the well-known manner by manual operation of the usual engineer's automatic brake valve device (not shown) provided on the locomotive; and to said pipe bracket are also connected by suitable piping an auxiliary reservoir 6, an emergency reservoir 7 and a conventional-type brake cylinder device 8.

The emergency portion 3 of valve device 1 comprises an emergency valve device 9, an emergency brake pipe vent valve device 10, a high pressure valve device 11, and an accelerated release selector valve device 12. The valve devices 9 and 12 are preferably identical with those shown and fully dscribed in the aforementioned copending application; whereas the valve devices 10 and 11, together with certain porting connections in the emergency portion 3, are improved in accordance with the present invention, in the manner hereinafter to be described.

The emergency valve device 9 may comprise an annular flexible diaphragm 13 suitably clamped about its outer edge between sections of the casing and about its inner edge between parts of a diaphragm follower assemblage 14. The diaphragm 13 is subject at one side to pressure of fluid in a chamber 15 that is constantly open to the brake pipe 5 via a passage 16, and is subject on the opposite side to pressure of fluid in a chamber 17 that is constantly open via a passage 18 to a quick action chamber 19 in the pipe bracket 2. Preferably formed integrally with one of the parts of the follower assemblage 14 is a coaxially-arranged stem 20 that projects through the chamber 17 and is slidable in a bore 21 extending through a bushing 22 that, in turn, is disposed within a bore 23 in the casing and has sealing contact with the wall of the latter bore; said bushing having an outwardly directed positioning shoulder 24 that engages the part of the end wall of chamber 17 encircling bore 23. A slide valve 25, which is held between two spaced-apart radial shoulders formed on the stem 20 for positive movement with said stem, is slidable on a seat formed in the bushing 22.

Disposed in a chamber 26, defined in part by the base and adjacent wall or bore 23 and constantly open to a branch of passage 18, is a helical return spring 27 that is adapted to act on the stem 20 through the medium of an annular spring cage 28 encircling a depending, reduced diameter portion of said bushing. The cage 28 comprises an outwardly directed flange 29 that is engaged by the spring 27 and also comprises an inwardly directed flange 30 which overlies the end of the depending portion of the bushing 22 and is adapted to engage the lower end of the stem 20 if and when said lower end projects exteriorly of the bushing, for thereupon causing said spring to resist any further movement of said stem in the direction of the chamber 26; said spring being ineffective for urging said stem in the opposite direction when the flange 30 engages the depending portion of said bushing.

Arranged coaxially with the stem 20 is a rod 31 that has sealing, slidably guided engagement with the wall of an aligned bore through a casing partition 32 separating chamber 26 from a chamber 33. An accelerated release check valve 34 in a chamber 35 controls fluid pressure communication between the chambers 35, 33. The check valve 34 is normally held seated by a bias spring 36 in chamber 35, but is adapted to be unseated by the projecting end of rod 31.

The brake pipe vent valve device 10 comprises a flexible diaphragm 37 that is suitably clamped at its outer edge between sections of the casing and is subject at one side to pressure of fluid in a chamber 38. At the opposite side of diaphragm 37 is a chamber 39 which is constantly open to atmosphere via a passage 40 and an atmospheric vent protector 41. The diaphragm 37 is operatively connected through the medium of a diaphragm follower 42 to a coaxially-arranged valve stem 43 slidably mounted in a bore 44 open to chamber 39; the inner end of bore 44 being open to a chamber 45 that is exposed to atmosphere via the vent protector 41. Arranged coaxially with the stem 43 is a vent valve 46, preferably in a form of a disc-shaped check valve, which is contained in a chamber 47 constantly open to a branch of brake pipe passage 16 and controls fluid pressure communication between chamber 47 and atmospheric chamber 45. The vent valve 46 is suitably retained, as by a retaining ring, within a rim-like part of a coaxially-arranged combination spring and valve retaining member 48 that is slidably mounted in an aligned bore 49 of larger diameter than bore 44. A helical bias spring 50 in chamber 47 acts on the member 48 at the side thereof opposite from vent valve 46 for causing a central protuberance 51 of said member to engage the vent valve 46 and hold same seated against an annular valve seat rib encircling the chamber 45, for thereby normally preventing release of fluid under pressure from the brake pipe to atmosphere.

According to a feature of the invention, the stem 43 merely serves to unseat the vent valve 46 against pressure of spring 50, upon supply of fluid under pressure to the chamber 38. The stem 43 is preferably provided with spaced annular cavities to reduce sliding friction; but since these cavities do not control any fluid pressure communications and since chambers 39 and 45 are both exposed to atmosphere, no O-ring seals are required to prevent leakage along the bore, thereby eliminating the need for the relatively expensive stainless steel valve bushing heretofore required.

The high pressure valve device 11, improved according to the invention, comprises a generally cylindrical valve member 52 slidably mounted in a bore 53 in the casing. The member 52 is subject at one end to pressure of fluid in a chamber 54 constantly open via respective branches of a passage 55 to chamber 38 of vent valve device 10 and to a port 56 in bushing 22 of emergency valve device 9. Valve member 52 is subject at the opposite end to pressure of fluid in a chamber 57 which is constantly open to the brake pipe 5 via a passage 58, a chamber 59, a passage 60, the usual curled-hair strainer 61 and a branch of brake pipe passage 16. At its end exposed to chamber 54, valve member 52 is of reduced diameter so as to provide an elongated annular cavity 62 which is separated by an O-ring seal 63 from an elongated annular cavity 64, which in turn is separated by an O-ring seal 65 from another elongated annular cavity 66, between which and the opposite end of said valve member are two spaced-apart O-ring seals 67, 68; said O-ring seals being carried in suitable grooves in said valve member and provided for preventing leakage of fluid under pressure along bore 53 between said cavities. The chamber 54 is constantly open via the cavity 62 and a restricted leakage port 69 to a passage 70 that is constantly open to atmospheric chamber 39 of vent valve device 10 by way of a quick action chamber blowdown control choke 71.

When chamber 54 is devoid of fluid under pressure and chamber 57 is charged with fluid from the brake pipe via previously-traced communication, the valve member 52 will assume a cut-off position, in which it is shown in the drawing. With valve member 52 in this position, cavity 64 connects passage 70 to a passage 72 leading to an atmospheric vent port 73 in the casing; cavity 66 is exposed solely to a passage 74, leading via a chamber 75 and a passage 76 to the emergency reservoir 7; and a passage 77 is then lapped by valve member 52, with leakage from the latter passage in either direction along the bore 53 being prevented by the seals 67, 68.

It is to be noted that the restricted leakage port 69 is of greater flow capacity than the quick action chamber blowdown choke 71; for example, the former may be of a size of a No. 60 drill, and the latter the size of a No. 73 drill. It has been found by actual tests that when fluid under pressure is supplied from the quick action chamber 19 via the emergency slide valve 25 to port 56 and passage 55 (as will hereinafter be more fully described), for supply to chamber 38 of vent valve device 10 and to chamber 54 of high pressure valve device 11, no delay whatsoever will be caused in the serial operation of these devices by virtue of the chamber 54 being open by way of the restricted leakage port 69 and cavity 64 to the atmospheric vent port 73. The leakage port 69, by thus being connected to atmosphere in the cut-off position of valve member 52, permits dissipation of fluid under pressure that may leak past the emergency slide valve 25 into the passage 55, so as to thereby prevent a buildup in pressure in the chamber 38 sufficient to cause undesired operation of the vent valve diaphragm 37 and consequent unseating of the vent valve 46.

The accelerated release selector valve device 12 may comprise a generally cylindrical valve member 78 having two spaced annular elongated cavities 79, 80 formed intermediate its respective ends and isolated from each other and from said respective ends by suitable O-ring seals carried by said valve member, such that said valve member has sealingly slidably-guided contact with the wall of a suitable bore in the casing. Valve member 78 is subject at one end to fluid pressure in a chamber 81 constantly open to a branch of quick action chamber passage 18; and is subject at the opposite end to pressure of a helical spring 82 in an atmospheric chamber 83.

When quick action chamber pressure in chamber 81 exceeds a chosen value, such as about 35 p. s. i., as determined by the selected value of spring 82, the selector valve member 78 will assume a normal position, in which it is shown in the drawing. In this position, cavity 80 is exposed solely to a branch of passage 77; and cavity 79 connects a passage 84, open to chamber 75 and the emergency reservoir 7, to a passage 85 leading to the chamber 35.

The service portion 4 of brake controlling valve device 1 comprises a service valve device 86 and a brake cylinder release and reapplication valve device 87, both of which may be identical in structure and in operation with those shown and fully described in the aforementioned copending application. It is sufficient to note, for purposes of the present invention, that the service valve device 86 comprises valve means (not shown) controlled by opposing pressures of fluid in the brake pipe 5 and auxiliary reservoir 6 and operative when brake pipe pressure equals or exceeds auxiliary reservoir pressure to establish connections whereby fluid under pressure supplied from the brake pipe 5 to the passage 60 is supplied therefrom at a restricted rate to a passage 88 leading to the auxiliary reservoir 6 and to a branch of passage 76 leading to the emergency reservoir 7 for charging said reservoirs; said valve means being responsive to a reduction in brake pipe pressure below a normal full charge value at a service or an emergency rate to effect supply of fluid under pressure from the auxiliary reservoir 6 to a branch of the passage 77 which (except under a condition not pertinent to the present invention) is connected, via a communication (not shown) controlled by the brake cylinder release and reapplication valve device 87, to a passage 89 leading to the brake cylinder device 8, for thereby providing in the latter device fluid at a pressure corresponding to the extent to which brake pipe pressure is reduced below said normal full charge value.

OPERATION

Initial charging of the apparatus

Assume that the improved brake apparatus is devoid of fluid under pressure. To initially charge this apparatus, the engineer, in accordance with the usual practice, effects supply of fluid under pressure to the brake pipe 5 at the locomotive.

As fluid under pressure is thus supplied to the brake pipe 5, it will flow, on a particular car, via respective branches of passage 16 to chamber 15 of emergency valve device 9 and also through the strainer 61 to passage 60, whence it will flow via a branch of the latter passage and at the restricted rate controlled by a quick action chamber charging choke 90 to chamber 17 of said emergency valve device. From chamber 17 such fluid will flow via respective branches of passage 18 to the quick action chamber 19, to the chamber 26 of valve device 9, and to chamber 81 of the accelerated release selector valve device 12. When pressure in chamber 81 exceeds the illustrative 35 p. s. i., the valve member 78 will shift, against resistance of spring 82, to its normal position, in which it is shown, for connecting passage 84 to passage 85, such that the chamber 35 beneath the accelerated release check valve 34 will thereupon be charged with fluid under pressure from the emergency reservoir 7, which reservoir is concurrently being charged with fluid under pressure by previously-described operation of the service valve device 86.

It should be noted that during initial charging the emergency valve device 9 may initially assume an accelerated release position, hereinafter to be defined, in which the check valve 34 is unseated; however, since brake pipe pressure will be higher than emergency reservoir pressure during initial charging, any fluid which flows from the emergency reservoir 7 past the check valve 34 into chamber 33 will merely flow via a passage 91 to a chamber 92 at one side of a back-flow check valve 93, which latter valve will then be held seated by a helical bias spring 94 and preponderant brake pipe pressure in the chamber 59, for preventing back flow of fluid under pressure from the emergency reservoir into the brake pipe during initial charging of the apparatus. When quick action chamber pressure in chambers 17 and 26 has substantially equalized with opposing brake pipe pressure in chamber 15, toward completion of initial charging, the emergency valve device 9 will be shifted to a normal or release position, in which it is shown, by pressure of spring 27 acting through the medium of the spring cage 28; said position being defined by engagement of the flange 30 of cage 28 with the lower end of the stem 20 and depending portion of the bushing 22.

Meanwhile, fluid under pressure supplied via passage 60 to passage 59 beneath the back-flow check valve 93 will flow from said chamber 59 through passage 58 to chamber 57 of high pressure valve device 11 for causing the valve member 52 to promptly shift to its previously defined cut-off position, if not already there, because chamber 54 will be maintained vented via cavity 62, restricted leakage port 69, cavity 64, passage 72, and the vent port 73; it being noted that the passage 55 and port 56 are lapped by the emergency slide valve 25, in both the accelerated release and release positions of the emergency valve device 9. With the passage 55 thus lapped by the slide valve 25 and open to atmosphere via the restricted port 69, as just described, the chamber 38 of vent valve device 10 will likewise be maintained vented via another branch of said passage 55, with the result that the spring 50 acting through the medium of the member 48 will hold the vent valve 46 seated and maintain the valve stem 43 in the position in which it is shown in the drawing.

Meanwhile, fluid under pressure will be supplied from the brake pipe via passage 60 and the service valve device 86 to the passages 88 and 76 for charging the auxiliary reservoir 6 and emergency reservoir 7, respectively, in the manner heretofore described.

During initial charging, it is customary to initially supply fluid to the brake pipe 5 at the locomotive at a pressure substantially in excess of brake pipe normal full charge value for providing a greater pressure head and thereby more rapidly initiating charging of the apparatus throughout the train; and then, after an interval of time during which brake pipe pressure on the car nearest the locomotive will have been built up to almost its normal full charge value, to supply fluid to the brake pipe at the locomotive at said normal full charge value. If, by failure to timely reduce to such brake pipe normal full charge value the pressure of fluid supplied to the brake pipe, the brake pipe and hence the quick action chamber 19 on the cars near the locomotive tend to become overcharged, such overcharge will be dissipated from the quick action chamber 19 into the emergency reservoir 7, which is of relatively large capacity, by flow past a spill-over check valve 95, which is interposed between branches of passages 18 and 74, so as to thereby prevent undesired operation of the emergency valve device 9 when brake pipe pressure is subsequently reduced to normal charge value. This check valve 95 is biased to a closed position by emergency reservoir pressure in passage 74 and pressure of a helical bias spring 96 which oppose quick action chamber pressure in passage 18 for preventing flow past said check valve except when quick action chamber pressure exceeds emergency reservoir pressure by a slight degree.

At the completion of initial charging, all of the components of the improved brake apparatus will be in the respective positions in which they are shown in the drawing.

Service application of the brakes

To initiate a service application of brakes, the engineer effects a service rate of reduction in brake pipe pressure in the brake pipe 5 at the locomotive from its normal full charge value to a chosen lower value corresponding to the degree of brake application desired, in the well-known manner.

On a particular car, the service valve device 86 responds to this reduction in brake pipe pressure by successively cutting off the brake pipe 5 from the auxiliary reservoir 6 and emergency reservoir 7 and then supplying fluid under pressure from the auxiliary reservoir to the brake cylinder device 8 via communication heretofore described, while bottling up fluid in the emergency reservoir 7.

Meanwhile, in the emergency portion 3, fluid pressure in chamber 15 of emergency valve device 9 will correspondingly reduce at a service rate until it is slightly less than quick action chamber pressure in chamber 17; whereupon the diaphragm 13 will be deflected upwardly and thereby shift the slide valve 25 to a position, defining a service position of the valve device 9, in which a port 97 in the emergency slide valve 25 registers with a port 98 in bushing 22 for permitting quick action chamber pressure in the chambers 17, 26 and 19 to blow down, by way of a breather choke 99 and the vent port 73, at substantially the same rate and to the same extent as brake pipe pressure; it being noted that due to the small pressure differential across the charging choke 90, back flow into the brake pipe 5 will be negligible.

This blow down of quick action chamber pressure, referred to as "breathing", prevents a pressure differential from being developed across the diaphragm 13 sufficient to effect upward movement of the diaphragm and slide valve 25 against resistance of a stabilizing spring 100, which is arranged coaxially with the diaphragm 13 and is suitably retained in a recess in the end wall of chamber 15 for limited expansion in the direction of said diaphragm. This "breathing" action will continue until, after brake pipe pressure is lapped at the chosen reduced value, the pressure in chambers 17, 26 and 19 will have reduced slightly below brake pipe pressure in chamber 15; whereupon diaphragm 13 will deflect downwardly and return the slide valve 25 to release position, in which it is shown in the drawing. Thereafter, quick action chamber pressure will equalize with brake pipe pressure through the choke 90.

Since, during a service application, the quick action chamber pressure will never be reduced below the illustratively assumed 35 p. s. i., even during a full service application of the brakes, quick action chamber pressure in chamber 81 will maintain the valve member 78 of accelerated release selector valve device 12 in its normal position, in which it is shown, against resistance of the spring 82. Also, since chamber 54 of high pressure valve device 11 will be maintained open to atmosphere via port 69, cavity 64 and vent port 73 throughout a service application of brakes, brake pipe pressure as noted in chamber 57 will maintain the valve member 52 in its normal position, in which it is shown.

Emergency application of the brakes

Assume now that, with the apparatus fully charged in the manner described in connection with initial charging, the brake pipe 5 is vented to atmosphere at an emergency rate, such as by the engineer at the locomotive or by the conductor actuating the conductor's vent valve.

On a particular car, the service valve device 86 will operate in the manner previously described to successively close off the brake pipe 5 from the auxiliary reservoir 6 and emergency reservoir 7, and then supply fluid under pressure from said auxiliary reservoir to the brake cylinder device 8, causing auxiliary reservoir pressure to equalize into the brake cylinder device 8.

Meanwhile, brake pipe pressure in chamber 15 of emergency valve device 9 will reduce at an emergency rate, causing preponderant quick action chamber pressure in chamber 17 to deflect diaphragm 13 upwardly, initially connecting the port 97 in emergency slide valve 25 to the breather choke 99 leading to the vent port 73, in the manner described in connection with a service application of brakes; but since said choke can only vent quick action chamber pressure at a rate equivalent to a service rate of reduction in brake pipe pressure, a pressure differential will build up promptly across the diaphragm sufficient to shift the follower assemblage 14 against resistance of the stabilizing spring 100 and into engagement with the end wall of chamber 15, thereby defining an emergency position of the valve device 9, in which a port 101 in the emergency slide valve 25 registers with the bushing port 56, for permitting quick action chamber air to flow via the latter ports to passage 55.

According to a feature of the invention, some of the fluid under pressure thus supplied to passage 55 will flow via one branch thereof to chamber 38 of vent valve device 10 for causing diaphragm 37 to deflect promptly for unseating the vent valve 46 through the medium of stem 43 and against resistance of the bias spring 50; whereupon fluid under pressure will be locally vented to atmosphere from the brake pipe 5 and from passages 16, 60 past the unseated valve 46 and through the vent protector 41. Some of the fluid under pressure supplied to passage 55 will also flow directly via another branch thereof to the chamber 54 of high pressure valve device 11 and thence initially flow at the restricted rate controlled by the port 69 to atmosphere via vent port 73; it being noted that the port 69 is sufficiently restricted to permit a rapid buildup in pressure in vent valve chamber 38 for causing prompt operation of vent valve device 10 in the manner just described. When quick action chamber pressure as noted in chamber 54 exceeds brake pipe pressure in chamber 57 (which is being vented via passage 60 and the open vent valve 46), the high pressure valve member 52 will be shifted to a cut-in position, in which cavity 66 connects passage 74 to passage 77 for permitting fluid under pressure to flow from the emergency reservoir 7 to the brake cylinder device 8 via passage 74, cavity 66, passage 77 and the passage 89, which latter passage will then be open to said passage 77 via communication (not shown) in the valve device 87. And also with valve member 52 in cut-in position, passage 70 will be isolated from the vent port 73 by the O-ring seal 63, and cavity 62 will connect chamber 54 to passage 70 via a branch of passage 70 by-passing restricted port 69, for permitting quick action chamber air to flow at a substantially unrestricted rate to the passage 70.

According to a feature of the invention, if it is desired to so restrict the rate of release of fluid pressure from the quick action chamber 19, and hence from the chamber 38 of vent valve device 10, as to provide the normal one-minute delay period before pressure in the latter chamber will be reduced sufficiently to permit the spring 50 to effect reseating of the vent valve 46, then the blow down of quick action chamber pressure will be at the rate controlled by the blowdown control choke 71; a plug 102 being inserted in a branch of passage 70 leading to atmosphere in by-pass of said choke 71. However, if for ore cars or for other special situations where trains are short, it is desired to effect a reduction in quick action chamber pressure in chamber 38 at a maximum rate so as to cause spring 50 to effect reclosure of vent valve 46 within a minimum period, such as 3½ to 4 seconds, after the vent valve was opened, then the plug 102 is removed, and fluid under pressure will be vented from the quick action chamber 19 to atmosphere at a substantially unrestricted rate via the branch of passage 70 by-passing the restricted leakage port 69 and thence directly to atmosphere in by-pass of choke 71 via the unrestricted atmospheric connection afforded by the removal of said plug. By way of contrast, with apparatus heretofore proposed, it is not possible to effect reclosure of vent valve in less than about 8½ seconds.

It will of course be understood that by substituting for plug 102 a choke of selectable flow capacity, the rate of blowdown of quick action chamber pressure may be controlled to cause the closure of the vent valve 46 at any desired time between 3½ seconds and one minute after it has been opened during an emergency application of brakes. It will also be understood that so long as the vent valve 46 is opened, the brake pipe 5 cannot be effectively charged from the locomotive because the brake pipe will be locally opened to atmosphere; and hence the sooner the vent valve is reclosed, the sooner the brake pipe may be recharged for releasing brakes (in the manner hereinafter to be described) and thereby permitting the train to get under way.

Assuming now that quick action chamber pressure is being vented, either at the slower rate controlled by choke 71 with plug 102 in place or at the maximum rate afforded by removal of said plug, the valve member 78 of accelerated release selector valve device 12 will be shifted by spring 82 to a backdump position, as soon as quick action chamber pressure as noted in chamber 81 is reduced below the illustratively assumed 35 p. s. i. With valve member 78 in this position, cavity 80 will connect passage 77 to passage 85 for thereby opening the brake cylinder device 8 to chamber 35 beneath the accelerated release check valve 34, in preparation for an accelerated release of the emergency brake application, in the manner hereinafter to be described.

When quick action chamber pressure as noted in chamber 38 of vent valve device 10 has been reduced sufficiently, the vent valve 46 will be closed by pressure of spring 50; whereupon quick action chamber pressure will continue to blow down to atmosphere via choke 71 or via the aforementioned unrestricted branch of passage 70 if plug 102 has been removed.

*Accelerated release of brakes after an emergency application*

As soon as the vent valve 46 has been closed, in the manner just described, the engineer may effect supply of fluid under pressure to the brake pipe 5 at the locomotive for initiating a release of the emergency brake application.

On the car nearest the locomotive, fluid under pressure thus supplied to the brake pipe 5 will flow via passage 16 to chamber 15 of emergency valve device 9, causing the diaphragm 13 to promptly deflect and through the medium of the stem 22 and rod 31 unseat the accelerated release check valve 34 against resistance of spring 36; it being noted that chamber 17 will then be devoid or substantially devoid of fluid under pressure due to prior venting of quick action chamber 19. Since, so long as auxiliary reservoir pressure exceeds brake pipe pressure, the service valve device 86 will remain in a service position in which the auxiliary reservoir 6 is opened to the brake cylinder device 8; fluid under pressure from both the brake cylinder device and auxiliary reservoir will flow via passage 77, cavity 80 of selector valve member 78 in backdump position, passage 85, and thence past the unseated accelerated release check valve 34 to passage 91, whereupon it will unseat and then flow past the backflow check valve 93 through passages 60, 16 to the brake pipe 5 for causing a rapid buildup in brake pipe pressure locally on a particular car which, in turn, will initiate successive, similar operation of the brake controlling valve devices 1 on the rearward cars for causing a rapid serial buildup in brake pipe pressure throughout the train. This flow from the brake cylinder device 8 and auxiliary reservoir 6 into the brake pipe 5, referred to as "back dump," will continue until brake pipe pressure has increased to within about 2 p. s. i. of equalization with the pressure in said brake cylinder device and auxiliary reservoir; whereupon the spring 94 will seat the back-flow check valve 93 for terminating "back dump."

Meanwhile, some of the fluid under pressure supplied to passage 60 will flow to chamber 57 of high pressure valve device 11 for promptly shifting the valve member 52 to its cut-off position, in which it is shown in the drawing, and in which the passage 74 leading to the emergency reservoir 7 is disconnected from the passage 77 leading to the brake cylinder device 8; it being noted that such shifting will occur at a relatively low value of brake pipe pressure because chamber 54 will be substantially devoid of fluid under pressure.

Meanwhile, back dump will reduce auxiliary reservoir pressure, with the result that upon seating of the backflow check valve 93, fluid under pressure will be temporarily bottled up in the brake cylinder device 8 and auxiliary reservoir 6 until brake pipe pressure has been increased to a value sufficiently in excess of auxiliary reservoir pressure to cause the service valve device 86 to operate successively to disconnect the auxiliary reservoir from the brake cylinder device and then vent the brake cylinder device to atmosphere while establishing connections whereby the auxiliary reservoir and emergency reservoir are recharged from the brake pipe.

Meanwhile, as brake pipe pressure is restored, the quick action chamber 19 and the chambers 17 and 26 of the emergency valve device 9 will be recharged at the restricted rate controlled by the quick action chamber charging choke 90. When quick action chamber pressure, and hence pressure in the chamber 81 of valve device 12, has increased to the illustrative 35 p. s. i., the valve member 78 will be shifted to its normal position, in which it is shown, for reconnecting passage 84 leading to the emergency reservoir with passage 85; whereupon fluid under pressure can be supplied from the emergency reservoir to the brake pipe for further locally increasing brake pipe pressure if brake pipe pressure has not by then been restored to a pressure within about 2 p. s. i. of emergency reservoir pressure (as determined by the back-flow check valve spring 94), which latter pressure will have been bottled up at a value near 60 p. s. i. when the high pressure valve member 52 shifted to its cut-off position at a relatively low value of brake pipe pressure, as above described.

Thereafter, when toward the end of a brake releasing operation, quick action chamber pressure has increased to within a few p. s. i. of brake pipe pressure, the spring 27 will shift the emergency valve device 9 from its accelerated release position to its release position, in which it is shown, thereby permitting the spring 36 to reseat the accelerated release check valve 34. It should be noted that in both of these last-mentioned positions of valve device 9, the ports 97 and 101 of the emergency slide valve 25 are disconnected from the vent port 73 and passage 55, respectively, for preventing release of quick action chamber pressure to atmosphere.

When brakes have been completely released, the various components will be in the respective positions in which they are shown in the drawing; the brake cylinder device 8 will be devoid of fluid under pressure; and the brake pipe 5, auxiliary reservoir 6, emergency reservoir 7 and quick action chamber 19 will be charged to the normal operating value of brake pipe pressure.

SUMMARY

It will now be seen that the improved brake apparatus embodies a novel arrangement whereby the emergency slide valve 25 in the emergency position of valve device 9 releases fluid under pressure from the quick action chamber 19 to a passage 55, respective branches of which lead to chamber 38 of vent valve device 10 and chamber 54 of high pressure valve device 11. Pressure of fluid thus supplied to chamber 38 causes prompt unseating of the vent valve 46 for venting the brake pipe 5 to atmosphere; and after the vent valve has thus been unseated, pressure of fluid in chamber 54 will shift the high pressure valve member 52 to a cut-in position, against opposing reduced brake pipe pressure in chamber 57, for supplying fluid under pressure from the emergency reservoir to the brake cylinder to augment pressure of fluid supplied thereto from the auxiliary reservoir by operation of the service valve device 86. And also with valve member 52 in this position, the chamber 54 will be opened to a passage 70 through which quick action chamber pressure will be vented to atmosphere.

If a relatively slow rate quick action chamber venting is desired, in order to cause the vent valve 46 to be held open by quick action chamber pressure for the normal one-minute period to assure complete venting of brake pipe throughout a long freight train, then a plug 102 is inserted in the branch of passage 70 leading to atmosphere in by-pass of a blow-down control choke 71 and the venting will be accomplished at the restricted rate controlled by said choke, which is tuned to provide this one-minute period. If, however, in special situations such as with ore cars formed in short trains, it is desired to vent the quick action chamber 19 at a maximum rate to cause reclosure of the valve 46 within about 3½ to 4 seconds after it is opened, then the plug 102 is removed to provide a maximum quick action chamber blow-down rate; it being noted, by way of contrast, that with apparatus previously proposed, the vent valve will be held open for at least 8½ seconds even if the quick action chamber blow-down choke in such apparatus is removed.

It will be understood that the vent valve 46 may be caused to remain open for any selected period of time from 3½ seconds to one minute by substitution of a properly-tuned choke in place of the plug 102.

With the novel arrangement hereinabove described, the vent valve device 10 merely effects opening of the vent valve 46, and the valve stem 43 controls no other fluid pressure communications, such as are controlled with apparatus heretofore proposed. The arrangement herein proposed eliminates the need for a relatively expensive stainless steel bushing, eliminates the necessity and expense of cutting ports in said bushing and grooving the valve stem to accommodate O-rings, and eliminates O-ring friction because O-rings may be dispensed with since the chambers 39 and 45 of the vent valve device are both opened to atmosphere.

Having now described the invention, what I claim as new and desire to secure by Letters Patent, is:

1. In a fluid pressure brake apparatus for a railway car, in combination, a normally charged brake pipe, a passage, emergency valve means responsive to an emergency rate of reduction in brake pipe pressure to supply fluid under pressure to said passage, vent valve means controlled by brake pipe pressure opposing pressure of fluid in said passage and normally biased to close off the brake pipe from atmosphere and responsive to supply of fluid under pressure to said passage to open said brake pipe to atmosphere for locally venting the brake pipe, means defining a vent communication of selected flow capacity for controlling the rate at which fluid under pressure may be released from said passage, and valve means controlled by brake pipe pressure opposing pressure of fluid in said passage and normally biased by brake pipe pressure to one position for establishing a restricted connection between said passage and vent communication and operative upon a preponderance of fluid pressure in said passage over brake pipe pressure to another position to establish a substantially unrestricted connection between said passage and vent communication in bypass of said restricted connection whereby the length of time the brake pipe is maintained open to atmosphere by said vent valve means will be controlled according to selected flow capacity of said vent communication.

2. In a fluid pressure brake apparatus for a railway car, in combination, a normally charged brake pipe, an emergency reservoir, a brake cylinder, a passage, emergency valve means responsive to an emergency rate of reduction in brake pipe pressure to supply fluid under pressure to said passage, vent valve means biased to normally close off the brake pipe from atmosphere and responsive to supply of fluid under pressure to said passage to open said brake pipe to atmosphere for locally venting the brake pipe, means defining a vent communication of selected flow capacity for controlling the rate at which fluid under pressure may be released from said passage, and other valve means controlled by brake pipe pressure opposing pressure of fluid in said passage and normally biased by brake pipe pressure to one position for establishing a restricted connection between said passage and vent communication and operative upon a preponderance of fluid pressure in said passage over brake pipe pressure to another position for supplying fluid under pressure from said emergency reservoir to said brake cylinder and also establish a substantially unrestricted connection between said passage and vent communication in bypass of said restricted connection whereby the length of time the brake pipe is maintained open to atmosphere by said vent valve means will be controlled according to selected flow capacity of said vent communication.

3. In a fluid pressure brake apparatus for a railway car, in combination, a normally charged brake pipe, a passage, a quick action volume chamber charged from said brake pipe, emergency valve means subject opposingly to pressures of fluid in said brake pipe and quick action volume chamber and responsive to an emergency rate of reduction in brake pipe pressure to effect supply of fluid under pressure from said quick action volume chamber to said passage, vent valve means responsive to quick action volume chamber pressure supplied to said passage to open said brake pipe to atmosphere and operative responsively to a reduction in such pressure in said passage below a chosen value to close off said brake pipe from atmosphere, means defining a vent communication of chosen flow capacity for controlling the rate of release of quick action volume chamber pressure to atmosphere, and other valve means controlled by opposing fluid pressures in said brake pipe and passage and responsive to pressure of fluid supplied to said passage from said quick action volume chamber to establish a substantially unrestricted connection between said passage and vent communication.

4. In a fluid pressure brake apparatus for a railway car, in combination, a normally charged brake pipe, an emergency reservoir, a brake cylinder, a passage, a quick action volume chamber charged from said brake pipe, emergency valve means subject opposingly to pressures of fluid in said brake pipe and quick action volume chamber and responsive to an emergency rate of reduction in brake pipe pressure to effect supply of fluid under pressure from said quick action volume chamber to said passage, vent valve means responsive to quick action volume chamber pressure supplied to said passage to open said brake pipe to atmosphere and operative responsively to a reduction in such pressure in said passage below a chosen value to close off said brake pipe from atmosphere, means defining a vent communication of chosen flow capacity for controlling the rate of release of quick action volume chamber pressure to atmosphere, and other valve means controlled by opposing fluid pressures in said brake pipe and passage and normally biased by brake pipe pressure for closing off the emergency reservoir from the brake cylinder and also establishing a restricted leakage connection from said passage to atmosphere for preventing any fluid under pressure which may leak into said passage from causing undesired operation of said vent valve means, said other valve means being operative responsively to supply of fluid under pressure to said passage at a substantially unrestricted rate concurrently with venting of said brake pipe for successively disestablishing said leakage connection and then opening said emergency reservoir to said brake cylinder while also establishing a substantial unrestricted connection between said passage and vent communication, whereby the length of time the vent valve means will maintain the brake pipe open to atmosphere will be controlled according to the chosen flow capacity of said vent communication.

5. In a fluid pressure brake apparatus for a railway car, in combination, a normally charged brake pipe, an emergency reservoir, a brake cylinder, a first passage, a quick action volume chamber having restricted communication with said brake pipe, emergency valve means subject opposingly to pressures of fluid in said brake pipe and quick action volume chamber and responsive to an emergency rate of reduction in brake pipe pressure to effect supply of fluid under pressure from said quick action volume chamber to said first passage, vent valve means responsive to quick action volume chamber pressure supplied to said first passage to open said brake pipe to atmosphere and operative responsively to a reduction in such pressure in said first passage below a chosen value to close off said brake pipe from atmosphere, a second passage, other valve means controlled by opposing pressures of fluid in said first passage and brake pipe, and operative responsively to supply of fluid under pressure to said first passage concurrently with venting of said brake pipe to effect supply of fluid under pressure from said emergency reservoir to the brake cylinder and also establish a substantially unrestricted connection between said first and second passages, choke means in said second passage for restricting rate of release of fluid under pressure therefrom to atmosphere, and plug means normally inserted in a branch of said second passage leading to atmosphere for causing rate of release of fluid under pressure to be controlled at a minimum rate corresponding to the selected flow capacity of said choke means, said plug means being removable to provide release of fluid under pressure from said second passage directly to atmosphere at a maximum rate.

6. In a fluid pressure brake apparatus for a railway car, in combination, a normally charged brake pipe, vent valve means having a control chamber and operative to establish or disestablish a connection between the brake pipe and atmosphere according to whether pressure of fluid in said control chamber is respectively greater than or less than a chosen value, a quick action volume chamber having restricted connection with said brake pipe, means defining a vent communication of selected flow capacity for controlling the rate at which fluid under pressure may be released from said quick action volume chamber, other valve means subject to opposing fluid pressures in said brake pipe and in a pressure chamber and operative responsively to supply of fluid under pressure to said pressure chamber at a substantially unrestricted rate concurrently with venting of said brake pipe to establish a substantially unrestricted connection between said pressure chamber and vent communication, and emergency valve means subject opposingly to fluid pressures in said brake pipe and quick action volume chamber and responsive to an emergency rate of reduction in brake pipe pressure to concurrently supply fluid under pressure from said quick action volume chamber to the control chamber of said vent valve means and also to the pressure chamber of said other valve means for causing successive operation of said vent valve means and then of said other valve means to respectively open the brake pipe to atmosphere and then open said quick action volume chamber to the vent communication.

7. In a fluid pressure brake apparatus for a railway car, in combination, a normally charged brake pipe, an emergency reservoir, a brake cylinder, a first passage, a quick action volume chamber having restricted connection with said brake pipe, emergency valve means subject opposingly to pressures of fluid in said brake pipe and quick action volume chamber and responsive to an emergency rate of reduction in brake pipe pressure to effect supply of fluid under pressure from said quick action volume chamber to said first passage, vent valve means responsive to quick action volume chamber pressure supplied to said first passage to open said brake pipe to atmosphere and operative responsively to a reduction in such pressure in said first passage below a chosen value to close off said brake pipe from atomsphere, a second passage, other valve means controlled by opposing pressures of fluid in said first passage and brake pipe and normally biased by brake pipe pressure to a position for closing off the emergency reservoir from the brake cylinder while also establishing a restricted leakage connection from said first passage to atmosphere for preventing any fluid under pressure which may leak into said first passage from causing undesired operation of said vent valve means, said other valve means being operative upon supply of fluid under pressure to said first passage at a substantially unrestricted rate concurrently with venting of said brake pipe to successively disestablish said leakage connection and then open said emergency reservoir to said brake cylinder while also establishing a substantially unrestricted connection between said first passage and second passage, and quick action volume chamber blowdown control means for providing restricted rate of release of fluid under pressure from said second passage to atmosphere, the flow capacity of said quick action volume chamber control means being less than that of said restricted leakage connection.

8. In a fluid pressure brake apparatus for a railway car, in combination, a normally charged brake pipe, an emergency reservoir, a brake cylinder, vent valve means having a control chamber and operative to establish or disestablish a connection between the brake pipe and atmosphere according to whether pressure of fluid in said control chamber is respectively greater than or less than a chosen value, a quick action volume chamber having restricted connection with said brake pipe, means defining a vent communication of selected flow capacity for controlling the rate at which fluid under pressure may be released from said quick action volume chamber, other valve means subject to opposing fluid pressures in said brake pipe and in a pressure chamber and operative responsively to supply of fluid under pressure to said pressure chamber at a substantially unrestricted rate concurrently with venting of said brake pipe to effect supply of fluid under pressure from said emergency reservoir to said brake cylinder and while also establishing a substantially unrestricted connection between said pressure chamber and vent communication, and emergency valve means subject opposingly to fluid pressures in said brake pipe and quick action volume chamber and responsive to an emergency rate of reduction in brake pipe pressure to concurrently supply fluid under pressure from said quick action volume chamber to the control chamber of said vent valve means and also to the pressure chamber of said other valve means for causing successive operation of said vent valve means and then of said other valve means to respectively open the brake pipe to atmosphere and then open said quick action volume chamber to the vent communication.

References Cited in the file of this patent

UNITED STATES PATENTS 1,935,808   McCune _____ Nov. 21, 1933